United States Patent
Nagaoka

[19]
[11] Patent Number: 6,150,784
[45] Date of Patent: *Nov. 21, 2000

[54] METHOD OF DETECTING FOREIGN MATTER CAUGHT BY WINDOW IN POWER WINDOW DEVICE

[75] Inventor: Shuichi Nagaoka, Miyagi-ken, Japan

[73] Assignee: Alps Electric Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/137,489

[22] Filed: Aug. 21, 1998

[30] Foreign Application Priority Data

Aug. 22, 1997 [JP] Japan ................................. 9-226810

[51] Int. Cl.$^7$ ................................................. G05B 5/00
[52] U.S. Cl. ........................ 318/467; 318/469; 318/476
[58] Field of Search ................... 318/434, 280, 318/466–469, 474, 476, 477

[56] References Cited

U.S. PATENT DOCUMENTS

| | | | |
|---|---|---|---|
| 4,581,711 | 4/1986 | Hirata et al. ............................... | 702/64 |
| 5,012,168 | 4/1991 | Dara et al. ............................... | 318/434 |
| 5,162,711 | 11/1992 | Heckler ..................................... | 318/264 |
| 5,497,326 | 3/1996 | Berland et al. .................. | 364/424.045 |
| 5,530,329 | 6/1996 | Shigematsu et al. .................... | 318/469 |
| 5,539,290 | 7/1996 | Lu et al. .................................. | 318/565 |
| 5,563,482 | 10/1996 | Shaw et al. .............................. | 318/272 |
| 5,677,606 | 10/1997 | Otake ....................................... | 318/434 |

FOREIGN PATENT DOCUMENTS

61-60981 3/1986 Japan.

*Primary Examiner*—Brian Sircus
*Attorney, Agent, or Firm*—Brinks Hofer Gilson & Lione

[57] ABSTRACT

In a method of detecting a foreign matter caught by a window in a power window device which includes a window opening/closing motor, a motor drive unit, a pulse generator for generating pulses corresponding to the rotation of the motor, an MCU for executing overall control and drive processing and manually-operated switch unit, the MCU detects a parameter value indicating a motor load imposed on a window when the window is opened and closed through the motor drive unit, compares the parameter value with a preset reference median, determines that a foreign matter is caught by the window when the parameter value falls outside the reference median in a considerable amount and stops the drive of the motor or reverses the motor, wherein the reference median that is preset in the range where a foreign matter is detected within the entire moving region of the window is successively changed stepwise by the same displacement value. With the method arranged as described above, the storing area of a memory can be effectively used as well as the storing area can be reduced while maintaining the certainty of the detection of a foreign matter caught by the window.

3 Claims, 7 Drawing Sheets

| NUMBER EDGE INTERVAL DATA | REFERENCE MEDIAN |
|---|---|
| 63 | 5 |
| 70 | 6 |
| 75 | 7 |
| 270 | 6 |
| 440 | 7 |
| 585 | 8 |
| 685 | 9 |
| 833 | 8 |

FIG. 5B

| NUMBER EDGE INTERVAL DATA | REFERENCE MEDIAN |
|---|---|
| 63 | 5 |
| 72 | 6 |
| 80 | 7 |
| [210] | [6] |
| (236) | (7) |
| 270 | 6 |
| 440 | 7 |
| 585 | 8 |
| 685 | 9 |
| 833 | 8 |

REFERENCE MEDIAN RENEWED (WRITTEN) MOST RECENTLY

CHANGED AND RENEWED

REFERENCE MEDIAN AT PRESENT POSITION

DATA NOT RENEWED

NUMBER OF EDGE INTERVAL DATA WRITTEN MOST RECENTLY

NUMBER OF EDGE INTERVAL DATA AT PRESENT POSITION

METHOD OF DETECTING FOREIGN MATTER CAUGHT BY WINDOW IN POWER WINDOW DEVICE

BACKGROUND OF THE INVENTION

1. Field of the Invention

The present invention relates to a method of detecting a foreign matter caught by a window (hereinafter, referred to as a foreign matter detecting method) in a power window device, and more specifically, to a foreign matter detecting method of a power window device capable of correctly and effectively detecting that any foreign matter is caught by a window while it is being opened or closed in the state that a memory has a reduced storing capacity.

2. Description of the Related Art

There have been known various types of power window devices for an automobile which detect a foreign matter caught by a window and one of the devices is a power window device disclosed in Japanese Unexamined Patent Publication No. 61-60981.

The power window device disclosed in Japanese Unexamined Patent Publication No. 61-60981 uses a motor load current value as a parameter value for detecting a foreign matter caught by a window. In the device, the entire moving region of the window is equally divided into a plurality of divided moving regions and a reference current value is preset to each of the divided moving regions to indicate whether the foreign matter is caught by the window or not. While the window is moving, the motor load current value is detected and the detected motor load current value is compared with a reference current value. When the detected motor load current value greatly exceeds the reference current value, it is determined that the foreign matter is caught by the window and the movement of the window is stopped.

In this case, the reference current value in the power window device disclosed in Japanese Unexamined Patent Publication No. 61-60981 is set to each of the divided moving regions based on a peak motor load current value which is obtained when no foreign matter is caught while the window is moving in the divided moving region. Even if the reference current value is set once, it is not always fixedly used but properly renewed depending upon a peak motor load current value which is obtained when the window moves in the respective divided moving regions. That is, the reference current value has a learning function.

As described above, the power window device disclosed in Japanese Unexamined Patent Publication No. 61-60981 is arranged such that the entire moving region of the window is equally divided into the plurality of divided moving regions and the reference current value is preset to each of the divided moving regions to determine whether a foreign matter is caught by the window or not. Accordingly, the power window device has an advantage that it can more accurately detect whether a foreign matter is caught by the window or not.

The applicant has also proposed a power window device, in addition to the above power window device, for detecting a foreign matter caught by a window, the device being arranged such that motor load torque is used as a parameter value for detecting the foreign matter caught by the window, the entire moving region of the window is equally divided into a plurality of divided moving regions and a reference median is preset to each of the divided moving regions to detect whether the foreign matter is caught by the window or not.

Incidentally, any of the power window device disclosed in Japanese Unexamined Patent Publication No. 61-60981 and the power window device having been proposed by the applicant presets the reference current value or the reference median to each of the plurality of divided moving regions which are obtained by fixedly and equally dividing the entire moving region of the window. Thus, there is no difference between the reference current values or reference medians preset to adjacent divided moving regions. Otherwise, the difference between them is very small in many cases. At the time, a memory provided with a control unit of the power window devices includes a storing area for storing the reference current value or reference median preset to each of the divided moving regions. The reference current values or reference medians are stored in the storing area of the memory even if they are not almost different between the adjacent divided moving regions.

Since a lot of the reference current values or reference medians are stored in the storing area of the memory in any of the aforesaid power window devices, there is a problem that the capacity of the storing area must be increased and it is difficult to effectively use the storing area of the memory.

To solve the above problem, an object of the present invention is to provide a foreign matter detecting method in a power window device, the method being capable of effectively using the storing area of a memory and reducing the storing capacity of the memory while increasing the certainty for detecting the foreign matter caught by the window.

SUMMARY OF THE INVENTION

To achieve the above object, a method of detecting a foreign matter caught by a window in a power window device according to the present invention includes means for setting a reference median that is preset in the range where a foreign matter is detected by the window within the entire moving region of the window so that the reference median is successively changed stepwise by the same displacement value.

According to the above means, since the total number of reference medians can be considerably reduced as compared with the total number of the reference medians of the aforesaid power window device, the storing area, in which the reference medians are stored, of a memory of the aforesaid power window device can be greatly reduced as well as the storing area of the memory can be effectively used.

DESCRIPTION OF THE PREFERRED EMBODIMENT

In a foreign matter detecting method in a power window device according to an embodiment of the present invention, the power window device includes a motor for opening and closing the window through a window drive mechanism when the motor is driven, a motor drive unit for driving the motor, a pulse generator for generating pulses corresponding to the rotation of the motor, a micro control unit for executing overall control and drive processing and operation switches operated manually for indicating to open and close the window, wherein the micro control unit executes the steps of detecting a parameter value indicating a load imposed on the window when the window is opened or closed, comparing the detected parameter value with a preset reference median, determining that a foreign matter is caught by the window when the parameter value falls outside the reference median in a considerable amount and stopping the drive of the motor or reversing the motor. The reference median preset to the range, which is set within the entire moving region of the window and where a foreign matter caught by the window is detected, is successively changed stepwise by the same displacement value.

In this case, a foreign matter detecting method in a power window device as a specific example of the present invention is arranged such that a new reference median which is obtained by renewing a reference median is preset.

Embodiment

An embodiment of the present invention will be described below with reference to the accompanying drawings.

Figure 1:
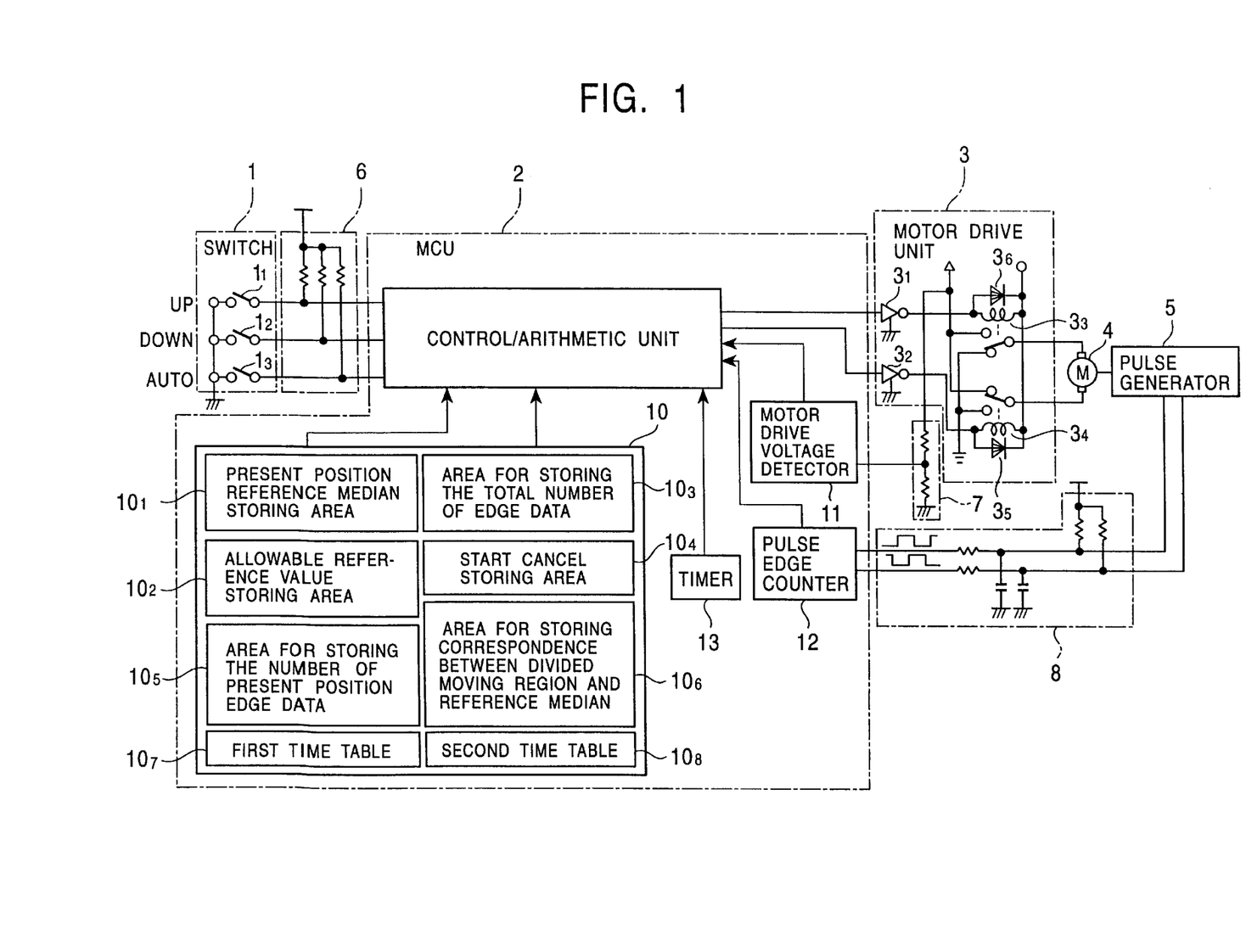
FIG. 1 is a block diagram showing a power window device in which an embodiment of a foreign matter detecting method according to the present invention is embodied.

FIG. 1 is a block diagram showing a power window device in which an embodiment of a foreign matter detecting method according to the present invention is embodied.

As shown in FIG. 1, the power window device includes a switch unit 1, a micro control unit (hereinafter, abbreviated as MCU) 2, a motor drive unit 3, a motor 4, a pulse generator 5, a pull-up resistor 6, a voltage dividing resistor 7 and a pulse transmission passage 8.

Figure 2A:
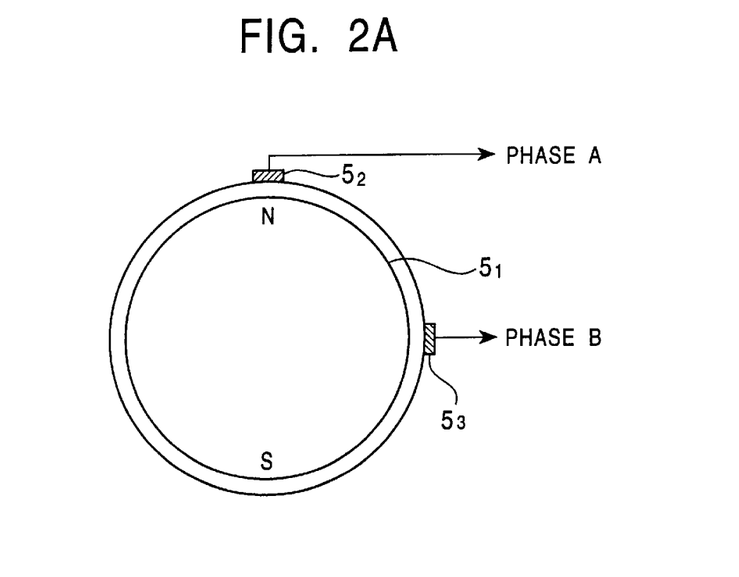
FIG. 2A is a view describing a principle why a pulse generator used in the power window device shown in FIG. 1 generates pulses.
Figure 2B:
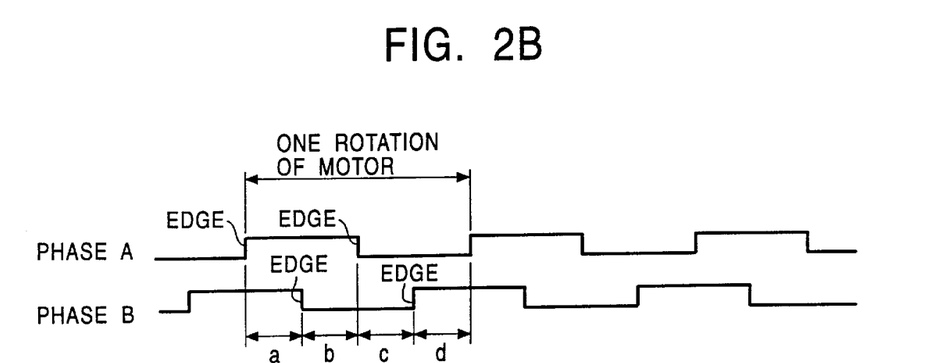
FIG. 2B is a waveform view showing 2-phase square-wave pulses generated by the pulse generator.

FIG. 2A is a view describing a principle why the pulse generator used in the power window device shown in FIG. 1 generates pulses and FIG. 2B is a waveform view showing 2-phase square-wave pulses generated by the pulse generator when the motor 4 is driven.

The switch unit 1 includes three switches $1_1$, $1_2$ and $1_3$ which are operated individually. The switches $1_1$ of these switches $1_1$ to $1_3$ indicates to lift (close) the window, whereas the switch $1_2$ indicates to lower (open) the window. The window is moved in an indicated direction only while the switches $1_1$, $1_2$ are being operated, and when the operation of the switches $1_1$, $1_2$ are stopped, the movement of the window is also stopped. The switch $1_3$ indicates to automatically continue the operation. When the switches $1_1$, $1_3$ are simultaneously operated, the window begins to be lifted (closed) as described above. However, even if the operation of the switches $1_1$, $1_3$ are stopped thereafter, the lifting (closing) operation of the window is continued and the window is stopped when it reaches the uppermost portion of a window frame. Whereas, when the switches $1_3$, $1_2$ are simultaneously operated, the window begins to be lowered (opened) likewise the mentioned above. However, even if the operation of the switches $1_3$, $1_2$ are stopped thereafter, the lowering (opening) operation of the window is continued and the window is stopped when it reaches the lowermost portion of the window frame.

The MCU 2 includes a control/arithmetic unit 9, a memory 10, a motor drive voltage detector 11, a pulse edge counter 12 and a timer 13. The control/arithmetic unit 9 of these components generates a control signal which corresponds to the operating state of the switch unit 1 and supplies the control signal to the motor 4 through the motor drive unit 3 to thereby rotate the motor 4. At the same time, the control/arithmetic unit 9 executes prescribed data processing and data calculation based on the data supplied from the motor drive voltage detector 11 and pulse edge counter 12 and controls the rotating state of the motor 4 through the motor drive unit 3. The memory 10 includes 6 storing areas composed of a reference median storing area $10_1$, an allowable reference value storing area $10_2$, an area $10_3$ for storing the total number of edge data, a start cancel storing area $10_4$, an area $10_5$ for storing the number of present position edge data (hereinafter, referred to as a storing area $10_5$) and an area $10_6$ for storing the correspondence between divided moving regions and reference medians (hereinafter, referred to as a storing area $10_6$) as well as two time tables composed of a first time table $10_7$ and a second time table $10_8$. The motor drive voltage detector 11 detects a divided voltage indicating the voltage of an on-vehicle battery which is obtained at the voltage dividing point of the voltage dividing resistor 7. The pulse edge counter 12 detects the pulse edge of the 2-phase square-wave pulses supplied from the pulse generator 5.

The motor drive unit 3 includes two inverters $3_1$, $3_2$ for reversing the control signal, two relays $3_3$, $3_4$ for switching the rotation of the motor 4 to a forward direction, reverse direction and stop position and two diodes $3_5$, $3_6$ for preventing the generation of a spark. Further, the motor drive unit 3 drives the motor 4 in accordance with the state of the control signal supplied from the MCU 2.

The motor 4 has a rotating shaft which is coupled with the window of an automobile through a not shown window drive mechanism. When the motor 4 rotates, for example, in the forward direction, it closes the window, whereas when the motor 4 rotates in the reverse direction, it opens the window.

The pulse generator 5 is directly mounted on the motor 4 and includes a rotating body $5_1$ and Hole elements $5_2$, $5_3$ as shown in FIG. 2A. The rotating body $5_1$ is mounted on the rotating shaft of the motor 4 and has an S-pole and an N-pole magnetized to confronting circumferential portions of the rotating body 51. The Hole elements $5_2$, $5_3$ are disposed in the vicinity of the circumference of the rotating body $5_1$ so as to generate 2-phase pulses whose phase is different 90° when the motor 4 rotates. When the motor 4 rotates, the rotating body $5_1$ is simultaneously rotated by the rotation of the motor 4. As a result, the two Hole elements $5_2$, $5_3$ detect the magnetized portions of the rotating body $5_1$ and the two Hole elements $5_2$, $5_3$ generate the two-phase square-wave pulses whose phase is displaced a ¼ of a cycle each other and which complete one cycle when the motor 4 makes one rotation, as shown in FIG. 2B.

The pull-up resistor 6 is composed of three parallel-coupled resistors which are connected between the output of the switch unit 1 and the MCU 2 and a 5-volt power supply and supplies a power supply voltage (5V) to the input of the MCU 2 when the three switches $1_1$, $1_2$, $1_3$ are not in operation.

The voltage dividing resistor 7 is composed of two series-coupled resistors connected in between an on-vehicle battery and the ground and the node of these resistors is connected to the motor drive voltage detector 11 of the MCU 2.

The pulse transmission passage 8 is composed of two pull-up resistors connected between the output of the pulse generator 5 and the 5V power supply, two capacitors connected between the above output and the ground and two resistors connected in series between the above output and the input of the pulse edge counter 12 of the MCU 2. The pulse transmission passage 8 transmits the 2-phase square-wave pulses output from the pulse generator 5 to the pulse edge counter 12.

When the motor 4 rotates and opens and closes the window, the 2-phase square-wave pulses generated by the pulse generator 5 are supplied to the MCU 2 through the pulse transmission passage 8. At the time, the pulse edge counter 12 detects the pulse edges (rising-up edges and falling-down edges) of each of the 2-phase square-wave pulses and supplies an edge detection signal to the control/arithmetic unit 9 each time a pulse edge arrives. The control/arithmetic unit 9 counts the timings at which the edge detection signals arrive through the timer 13 and measures a time interval between a time at which one edge detection signal arrives and a time at which a subsequent edge detection signal arrives (hereinafter, referred to as edge interval data). One edge interval data is obtained every time the motor 4 makes a ¼ of a rotation.

Incidentally, the power window device shown in FIG. 1 uses motor load torque as a parameter value for detecting whether a foreign matter is caught by the window or not. A reference median and an allowable reference value are also preset in accordance with the motor load torque. In addition, the power window device shown in FIG. 1 divides the entire moving region of the window (the region where the window moves between a totally close position and a totally open position) into respective moving regions based on the count number of the edge interval data which are counted every time they arrive. A reference median and an allowable reference value that are represented in terms of the motor load torque are preset to the range which is located in these moving regions and where a foreign matter caught by the window is detected, as described below.

Figure 6:
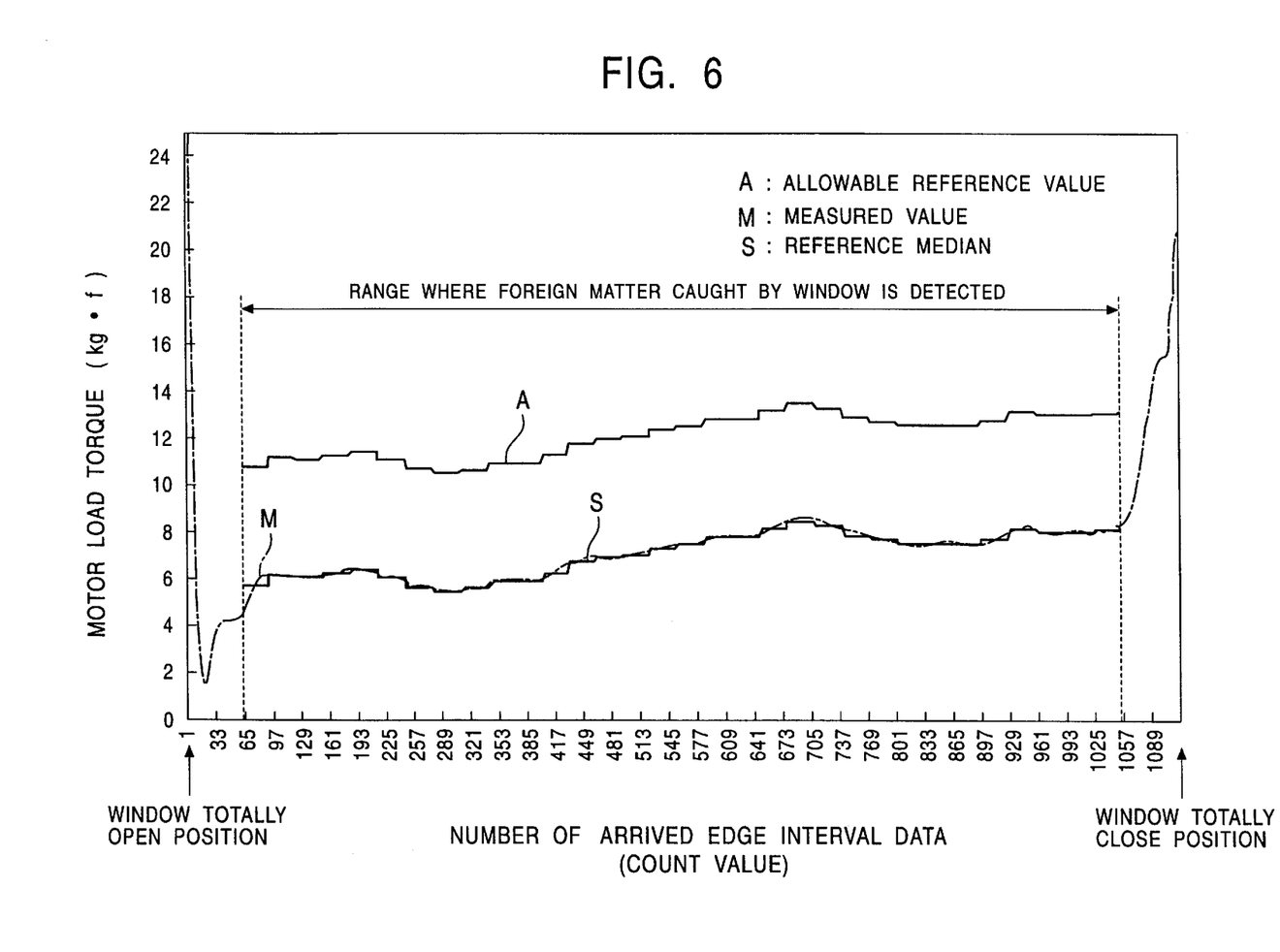
FIG. 6 is a characteristic view showing examples of motor load torque, which is measured in each of a plurality of divided moving regions when the entire moving region of a window is equally divided into the above divided moving regions, and the reference median and allowable reference value of the motor load torque which are preset to each of the divided moving regions.
Figure 7:
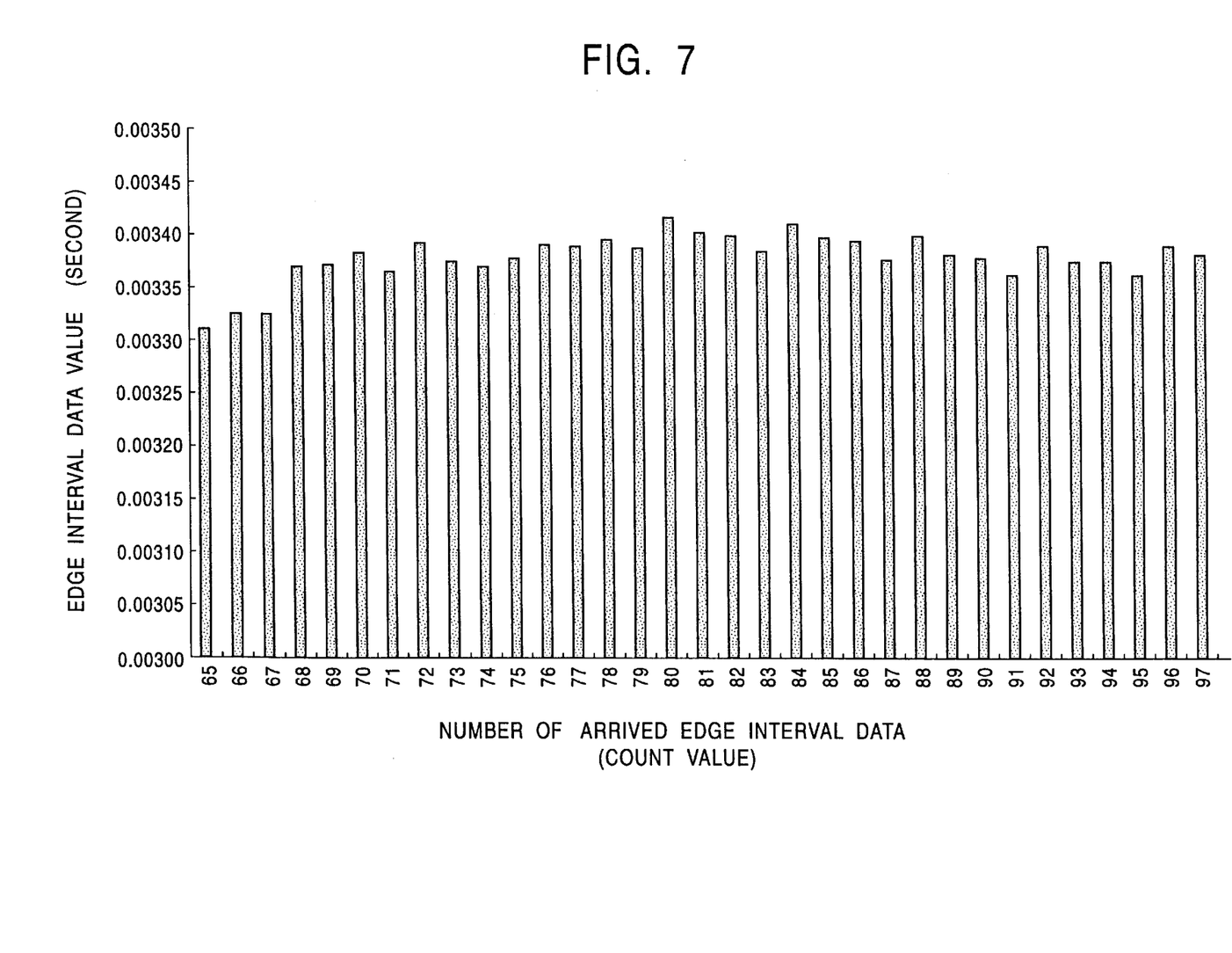
FIG. 7 is a characteristic view showing an example of the state that 32 edge interval data arrive in one of 36 divided moving regions shown in FIG. 6.

FIG. 6 is a characteristic view showing examples of motor load torque, a reference median and an allowable reference value in the power window device which has been proposed. The motor load torque is measured in each of the respective divided moving regions of the power window device which are obtained by equally dividing the entire moving region of a window into a plurality of regions, in this case, into 32 regions (however, both the ends of the entire moving region is excluded). The reference median and the allowable reference value are preset to each of the respective divided moving regions. FIG. 7 is a characteristic view showing an example of the state that 32 edge interval data arrive in one of the 32 divided moving regions shown in FIG. 6.

In FIG. 6, the ordinate represents the motor load torque and the abscissa represents the count number of the edge interval data which are counted every time they arrive when the window moves from the totally open position toward the totally close position. In FIG. 6, a stepwise characteristic (S) on a lower side shows the reference median of the motor load torque; a stepwise characteristic (A) on an upper side shows the allowable reference value of the motor load torque (more exactly, although this is the reference median +the allowable reference value, it is described below as the allowable reference value); and a dot-and-dash line (M) shows the behavior of the motor load torque used to set the reference median.

The reference median of the motor load torque shown in FIG. 6 is a motor load torque value which is necessary for the window to move, when a foreign matter is not substantially caught by the window. Actually, the weight of the window, the mechanical frictional force between the window and a window frame are measured as the motor load torque value and the reference median is determined based on the motor load torque value which has been measured when no foreign matter is caught by the window. Further, the reference median up that time is renewed to a new reference median every time the window moves, that is, the reference median is renewed through study. The motor load torque is calculated from the edge interval data and a motor drive voltage as described below. Since one edge interval data is obtained every time the motor 4 rotates a ¼ of a rotation, when the window moves from the totally open position to the totally closed position, 32 edge interval data are obtained in each of the 32 divided moving regions. That is, about 1200 edge interval data are obtained as a whole in the entire moving regions.

In this case, both the ends of the entire moving region are excluded from the region where a foreign matter caught by the window is detected and thus the reference median is also not set there. A reason of it is that the detection of an increase in the motor load due to a foreign matter caught by the window is difficult at both the ends. This is because that, when the motor 4 starts rotation in the vicinity of the totally open position, the load imposed on the motor 4 is extremely increased, whereas in the vicinity of a totally close position, the motor load torque is increased by the window glass which is abutted against the molding and so on of the window frame. Another reason of it is that a foreign matter is not caught in the vicinity of the totally open position because the interval between the window frame and the window glass is narrow there.

The allowable reference value of the motor load torque shown in FIG. 6 is set to a constant value regardless of the existence of the divided moving regions and ordinarily determined by a specification. The allowable reference value is set to a value which is obtained by converting a maximum allowable force which can be imposed on a foreign matter caught by the window into the motor load torque or to a value which is obtained by somewhat modifying the above value.

Figure 3:
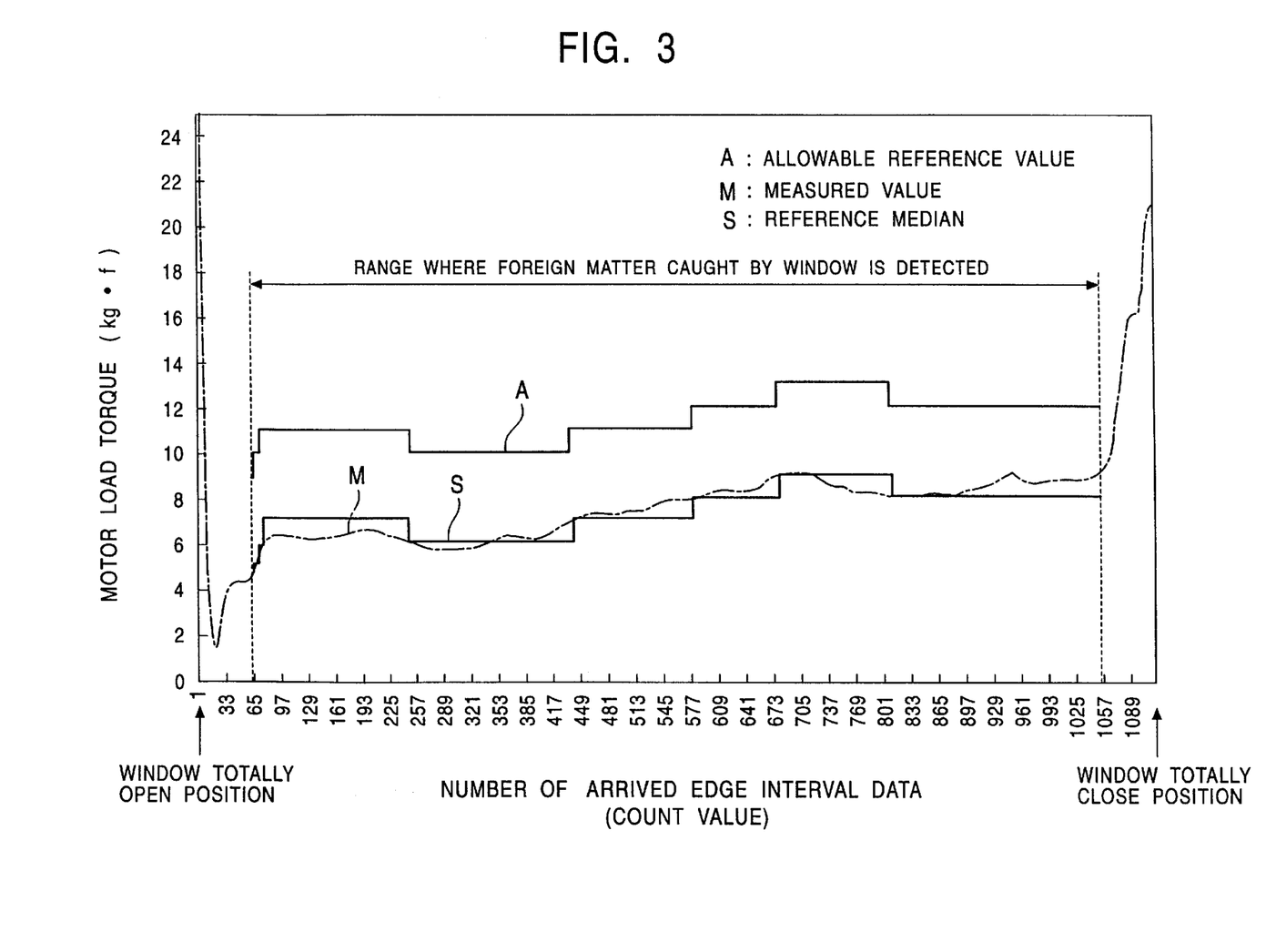
FIG. 3 is a characteristic view showing examples of motor load torque measured in the range which is set within the entire moving region of a window and where a foreign matter caught by the window is detected a preset reference median and a preset allowable reference value in the power window device of the embodiment.

FIG. 3 is a characteristic view showing examples of the motor load torque which is measured in the range which is set within the entire moving region of the window and where a foreign matter caught by a window is detected, a preset reference median and a preset allowable reference value in the power window device of the embodiment. FIG. 3 corresponds to FIG. 6 which shows the characteristic view of the power window device having been proposed.

As shown in FIG. 3, the power window device of the embodiment is arranged such that a constant displacement value h always exists between a reference median preset to a divided moving region in the range where a foreign matter caught by the window is detected and a reference median preset to a divided moving region adjacent to the above region. Thus, the magnitude of each reference median is n times the constant displacement value h (n is a positive integer). As a result, the values of the reference medians preset to the respective divided moving regions are sequentially changed stepwise by the same step height (displacement value) h.

Figure 4:
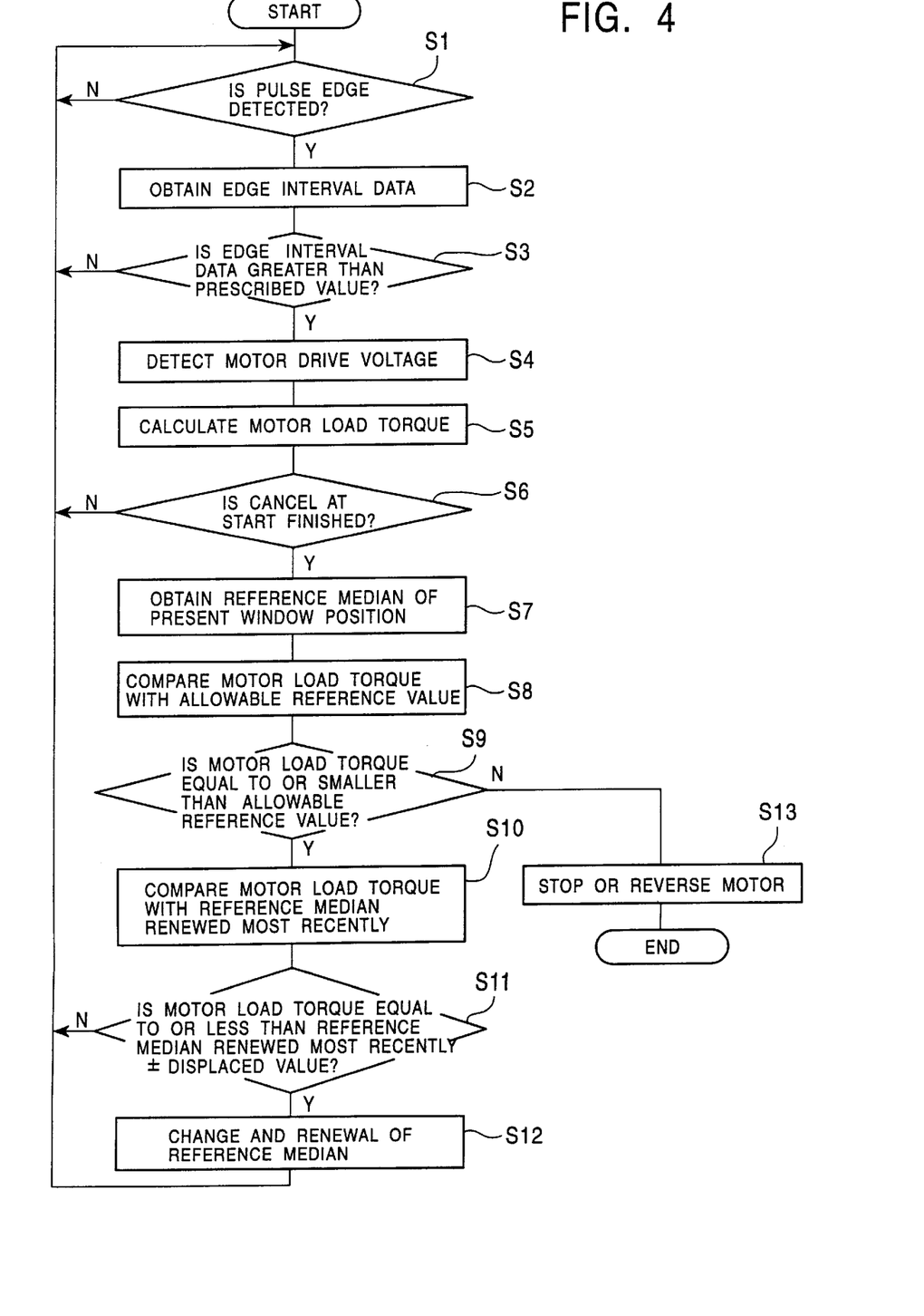
FIG. 4 is a flowchart showing the sequence of operations which are executed to detect a foreign matter caught by the window in the power window device in which the foreign matter detecting method according the present invention is embodied.

FIG. 4 is a flowchart schematically showing the sequence of operations for detecting a foreign matter caught by the window in the power window device shown in FIG. 1 in which the foreign matter detecting method according to the present invention is embodied.

The sequence of the operations executed by the power window device will be described with reference to the flowchart.

First, the operations executed by the power window device will be described below prior to the description of the operations executed according to the flowchart.

When one of the switches in the switch unit 1, for example, the switch $1_1$, is operated, the input of the MCU 2 connected to the switch $1_1$ changes from a 5V potential to the ground potential. The control/arithmetic unit 9 of the MCU 2 supplies a control signal for rotating the motor 4 in a forward direction to the motor drive unit 3 in response to the input ground potential. The motor drive unit 3 switches the two relays $3_3$, $3_4$ in response to the control signal to thereby rotate the motor 4 in the forward direction. When the motor 4 rotates in the forward direction, the window is moved in the direction where it is closed through the window drive mechanism coupled with the motor 4. Further, the pulse generator 5 mounted on the motor 4 generates 2-phase square-wave pulses in response to the rotation of the motor 4 and the thus generated 2-phase squire pulses are supplied to the pulse edge counter 12 of the MCU 2 through the pulse transmission passage 8.

When the operation of the switch $1_1$ is stopped here, the input of the MCU 2 connected to the switch $1_1$ changes from the 5V potential to the ground potential. The control/arithmetic unit 9 of the MCU 2 supplies a control signal for stopping the rotation of the motor 4 to the motor drive unit 3 in response to the input 5V potential. The motor drive unit 3 switches the two relays 33, 34 in response to the control signal to thereby stop the power supplied to the motor 4 and stop the rotation thereof. When the rotation of the motor 4 is stopped, the operation of the window drive mechanism coupled with the motor 4 is also stopped so that the window is stopped at the position where it is located at the time. Further, when the rotation of the motor 4 is stopped, the pulse generator 5 mounted on the motor 4 stops generating the 2-phase square-wave pulses so that they are not supplied to the pulse edge counter 12 of the MCU 2.

Next, another switch in the switch unit 1, for example, the switch $1_2$ is operated, the input of the MCU 2 connected to the switch $1_2$ changes to the ground potential likewise the aforesaid case. The control/arithmetic unit 9 of the MCU 2 supplies a control signal for rotating the motor 4 in an opposite direction to the motor drive unit 3 in response to the input ground potential. The motor drive unit 3 switches the relays $3_3$, $3_4$ in response to the control signal to thereby rotate the motor 4 in the opposite direction. When the motor 4 rotates in the opposite direction, the window is moved in the direction where it is opened through the drive mechanism coupled with the motor 4. When the motor 4 rotates, the pulse generator 5 mounted on the motor 4 also generates 2-phase square-wave pulses and supplies them to the pulse edge counter 12 of the MCU 2 through the pulse transmission passage 8.

Thereafter, when the operation of the switch $1_2$ is stopped, when the switch $1_1$ and the switch $1_3$ are simultaneously operated and when the switch $1_2$ and switch $1_3$ are simultaneously operated, operations similar to the aforesaid respective operations or operations in accordance with them will be carried out.

When these operations are executed, first, the control/arithmetic unit 9 of the MCU 2 determines, at step S1, whether the pulse edge counter 12 detects the pulse edge of the 2-phase square-wave pulse supplied from the pulse generator 5. When it is determined that the pulse edge is detected (Y), the process goes to next step S2, whereas when it is determined that the pulse edge is not detected (N), the process repeatedly executes step S1.

Next, when the pulse edge counter 12 detects the pulse edge, the control/arithmetic unit 9 obtains, at step S2, edge interval data which represents a time interval between the time when a pulse edge was detected last time and the time when a pulse edge is detected this time from the count of the timer 13. At the time, the control/arithmetic unit 9 counts the total number of the edge interval data which were obtained when the window moved the entire moving region from the totally open position to the totally close position previously and stores the total number of the edge data obtained by the count to the area $10_3$ of the memory 10 for storing the total number of edge data. Further, the control/arithmetic unit 9 sequentially stores the number of the edge interval data which represents the present position of the window to the storing area $10_5$.

Next, at step 3, the control/arithmetic unit 9 determines whether the obtained edge interval data is as long as or longer than a prescribed time (for example, 3.5 seconds) or not. That is, it is determined whether the edge interval data is proper edge interval data or a noise. When it is determined that the edge interval data is as long as or longer than the prescribed time (Y), the process goes to next step S4, whereas when it is determined that the edge interval data is shorter than the prescribed time, that is, it is the noise (N), the process returns to initial step S1 and repeats step S1 and subsequent steps. When a noise is multiplexed with the edge interval data in the determination, it is determined that the edge interval data is the proper edge interval data.

Subsequently, at step S4, the control/arithmetic unit 9 obtains the divided voltage detected by the voltage dividing resistor 7 in the motor drive voltage detector 11 as a motor drive voltage E.

Next, at step S5, the control/arithmetic unit 9 calculates motor load torque Tc using the thus obtained motor drive voltage E and edge interval data Pw. The motor load torque Tc is calculated based on the following formula (1).

$$Tc = \left\{ \left( kt \cdot \frac{E}{Rm} \right) - Tm \right\} - \frac{ke \cdot kt}{Rm \cdot Pw} \quad (1)$$

where, Tc : motor load torque

E: motor drive voltage kt: motor torque coefficient

Rm: motor winding resistance ke: motor power generation coefficient
Pw: edge interval data
Tm: motor internal torque In this case, the first time table $10_7$ stores the result of calculation of the former half term (kt·(E/Rm)−Tm) of the formula (1), that is, the term on which the motor drive voltage E depends in correspondence to the value of each motor drive voltage E. Whereas, the second time table $10_8$ stores the result of calculation of the latter half term (ke·kt)/(Rm·Pw) of the formula (1), that is, the term on which the edge interval data Pw depends in correspondence to the value of each edge interval data Pw. When the control/arithmetic unit 9 calculates the motor load torque Tc, it reads out, through the first time table $10_7$, the result of calculation showing the term on which the motor drive voltage E depends which corresponds to the values of the motor drive voltage E and the edge interval data Pw calculated at the time. At the same time, the control/arithmetic unit 9 reads out, from the second time table $10_8$, the result of calculation showing the term on which the edge interval data Pw depends. Thereafter, the control/arithmetic unit 9 calculates the motor load torque Tc using the thus read results of calculation.

Next, at step S6, the control/arithmetic unit 9 determines whether the operation executed when the motor 4 starts is finished or not. When it is determined that the operation at the start of the motor 4 is finished (Y), the process goes to next step S7, whereas when it is determined that the operation is not yet finished (N), the process returns to initial step S1 and executes step 1 and subsequent steps.

A reason why it is determined whether the operation executed when the motor 4 starts is finished or not is as described below. That is, when the motor starts, the internal torque of the motor 4 is changing from a maximal value to a steady value. Thus, if it is determined that a foreign matter is caught by the window based on the motor torque value calculated at the time, there is caused an erroneous determination that the foreign matter is caught by the window based on the measurement of a large motor torque value. Another reason is that if a reference median is renewed using the large motor torque value, a new reference median is set to an erroneous value which does not correspond to an actual state. In this case, whether the operation executed at the start of the motor 4 is finished or not is determined based on the period of time from the time at which an initial pulse edge is detected to the time at which a prescribed number of pulse edges are detected. When the operation executed at the start of the motor 4 is not finished, this fact is stored in the start cancel storing area $10_4$ of the memory 10 and it is cleared when it is stored a prescribed number of times.

Next, at step S7, the control/arithmetic unit 9 compares the table of the values of the reference medians, which correspond to the moved positions of the window and stored in the storing area $10_6$ with the number of edge data which are read from the storing area $10_5$ and determines the value of the reference median which corresponds to the present position of the window.

Figure 5A:
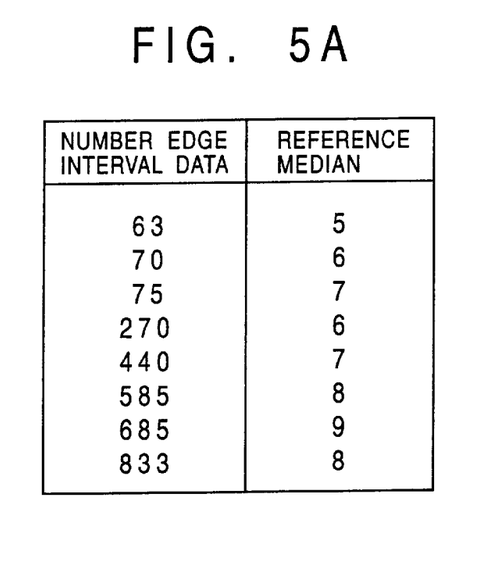
FIG. 5A and FIG. 5B are tables describing an example of the arrangement of data stored in an area for storing a correspondence between a divided moving region and a reference median.
Figure 5B:
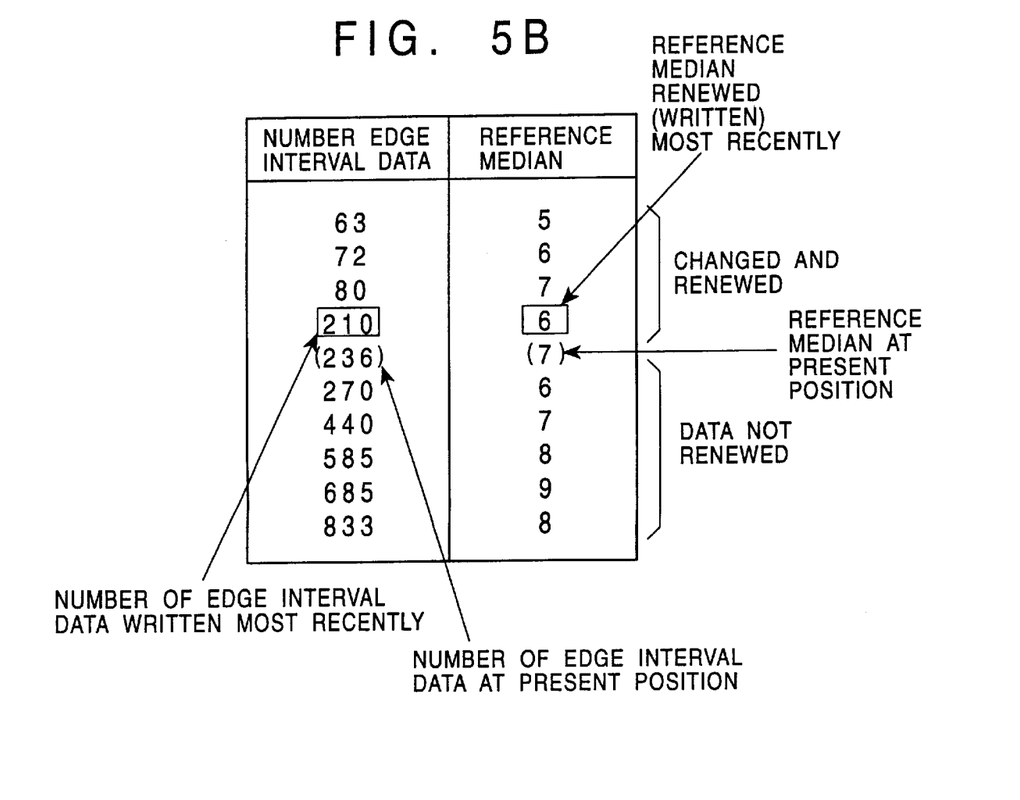

FIG. 5A and FIG. 5B are tables for describing an example of data which are stored in the storing area $10_6$.

How a reference median is set in correspondence to a present position of the window will be described with reference to FIG. 5A and FIG. 5B.

FIG. 5A shows data stored in the storing area $10_6$ when the window is moved from the totally open position to the totally close position in one stroke and respective reference medians are set to the entire moving region. The data shown in FIG. 5A corresponds to the reference medians set in FIG. 3. The data over the entire moving region of the window which is stored in the storing area $10_6$ is a pair of data composed of a reference median (column A) of each divided moving region and the number of edge interval data (column B) at the time each divided moving region begins. In the table shown in FIG. 5A, an interval, which ranges from the data value of the number of one edge interval data in the column B to a next data value, represents one divided moving region. Then, the data value in the column A which is paired with the smaller one of the above two data values is employed as the reference median of the above divided moving region. In the example, the aforesaid displacement value h is set to 1.

Incidentally, the present position reference median storing area $10_1$ stores a reference median at a present invention which is properly renewed based on the data value stored in the storing area $10_6$. In the aforesaid case, the present position reference median storing area $10_1$ does not store a present position reference median which corresponds to the data value 1200 of the number of edge interval data which indicates that the window is located at the totally close position. This is because that whether a foreign matter is caught by the window or not in a range near to the totally close position is not determined, as described above.

FIG. 5B shows the data stored in the storing area $10_6$ when the window moves from the totally close position to the totally open position once and thereafter it is located at some midpoint while moving toward the totally close position, that is, when the window is located at the position represented by, for example, the data value 236 of the number of edge interval data. In this case, the data values in both the item B and the item A are different from those shown in FIG. 5A in the range of the data values which are smaller than the data value which represents the present position of the window. This is because that those data values are obtained by changing and renewing the divided moving regions and reference medians corresponding thereto. On the other hand, the above data values are the same as those shown in FIG. 5A in the range of the data values of the number of edge interval data which is larger than the data value 236 thereof which represents the present position of the window. This indicates that the divided moving region and the reference median corresponding thereto are not yet changed and renewed.

At the time, the present position reference median storing area $10_1$ stores a numeral 6 as the present position reference median.

At step S7, the present position reference median is obtained by being read from the data value of the number of edge interval data stored in the present position reference median storing area $10_1$. After it is obtained, there is searched, from the data values in the storing area $10_6$, the reference median that corresponds to the data value of the number of edge interval data showing a next present position, when the data value of the number of edge interval data in the storing area $10_5$ is increased by 1, in order to obtain the reference median that corresponds to the data value of the number of edge interval data showing the next present invention of the window. The data value in the present position reference median storing area $10_1$ is renewed and changed based on the searched reference median. At the time, when there is a data value that coincides with the number of edge interval data representing the next present position in the data values of the column A which shows the boundaries of the divided moving regions which have been set in the storing area $10_6$, the reference median of the column A that corresponds to the data value is employed as the present position reference median and written to the present position reference median storing area $10_1$. At the same time, the data value of the number of edge interval data having been used up to that time and the reference median corresponding to it are deleted from the storing area $10_6$. Whereas, when there is no data value in the column B that coincides with the number of edge interval data showing the next present position, no action is taken and the process goes to next step S8. In addition to the above processing, an allowable reference value is read out from an allowable reference value storing area $10_2$ which stores a prescribed allowable reference value, regardless of the divided moving region.

Subsequently, at step S8 and step S9, the control/arithmetic unit 9 determines whether or not the motor load torque Tc which was calculated at step S5 is within the range of the value (allowable reference value) which is obtained by adding the present position reference median which was read out at step S7 to the allowable reference value which was read out at step S7 likewise. When it is determined that the motor load torque Tc is within the allowable reference value (Y), the process goes to a next step S10, whereas when it is determined that the motor load torque Tc is beyond the allowable reference value (N), the process goes to another step S13.

Next, at step S10 and step S11, the control/arithmetic unit 9 compares the value of the motor load torque Tc calculated at the present position with the reference median which was renewed most recently. When the difference therebetween is equal to or greater than the displacement value h, the divided moving region and the reference median are renewed at step S12 which will be described later, whereas when the difference is less than the displacement value h, the process returns to initial step s1.

In the aforesaid case, the reference median renewed most recently is the reference median 6 which corresponds to the data value 210 of the number of edge interval data in FIG. 5B. The reference median renewed most recently is nearest to the data value of the number of present position edge interval data in the storing area $10_6$ as well as the reference median of the column A corresponding to the smaller data value of the column B. Therefore, a procedure for obtaining the reference median is executed such that the data value of the number of edge interval data stored in the storing area $10_5$ is read out, a data value which is smallest and nearest to the read data value is searched from the data values in the column A in the storing area $10_6$ and the reference median in the column A that corresponds to the above value is read out.

Subsequently, at step S12, the control/arithmetic unit 9 writes the data value of the new number of edge interval data and a new reference median as a pair to the storing area $10_6$. In this case, the data read from the storing area $10_5$ is applied as the data value of the new number of edge interval data. Further, when the value of the motor load torque Tc is greater than the reference median, which was renewed most recently, by at least the displacement value h at step S11, the value obtained by adding the displacement value h to the reference median renewed most recently is used as the new reference median. Whereas, when the value of the motor load torque Tc is smaller than the reference median renewed most recently by at least the displacement value h, the value obtained by subtracting the displacement value h from the reference median renewed most recently is used as the new reference median.

The operation shown in the flowchart is repeatd until the drive of the motor 4 is stopped by the operation of the switch $1_1$ or switch $1_2$ to thereby stop the movement of the window. Otherwise, the operation is repeated until a foreign matter caught by the window is detected and the drive of the motor 4 is stopped to thereby stop the movement of the window or the motor 4 is rotated in the opposite direction to thereby reverse the movement of the window at step S13 which will be described below.

At step S13, the control/arithmetic unit 9 supplies a control signal to the motor drive unit 3 and switches the two relays $3_3$, $3_4$ to thereby stop the rotation of the motor 4 and the movement of the window. Otherwise, the control/arithmetic unit 9 rotates the motor 4 in a direction opposite to the direction up to that time to thereby move the window in a direction opposite to the direction up to that time so as to protect a foreign matter caught by the window from being damaged.

In the flowchart, step S2 to step S6 are an operation process for obtaining data in order to obtain the edge interval data, step S7 to step S9 are an operation process for determining whether a foreign matter is caught by the window or not, step S10 to step S12 are an operation process for renewing the reference median of the motor load torque Tc and step S13 is an operation process for stopping or reversing the drive of the motor 4.

When the above operations are repeated, the relationship between the measured value (M) of the motor load torque Tc and the reference medians (S) preset to the respective divided moving regions is in the state shown in FIG. 3 just after the window moves from the totally open position to the totally close position as described above. However, when the window moves from the totally close position to the totally open position once and further moves from the totally open position toward the totally close position, the divided positions of the divided moving regions, which are preset in the left direction from the present position of the window, that is, preset within the range in the direction of the totally open position, and the reference medians in the respective divided moving regions are changed and renewed. As a result, the range of the divided moving regions and the total number of the divided moving regions are not always the same as those before they are changed and renewed over the entire moving region.

The operation according to the flowchart shown in FIG. 4 is executed in the power window device shown in FIG. 1. When the window moves in the range where a foreign matter caught by the window is detected during operation and no foreign matter is caught in the range, the motor load torque Tc does not exceed the value obtained by adding the allowable reference value to the reference median preset to each divided moving region.

Whereas, when the window moves from the totally open position to the totally close position and a foreign matter is caught by the window during movement, the motor load torque Tc exceeds the value obtained by adding the allowable reference value to the reference median preset to the divided moving region where the foreign matter is caught because the motor load torque Tc abruptly increases.

According to the foreign matter detecting method of the power window device of the embodiment, since the reference median preset to the range, which is set within the entire moving region of the window and where a foreign matter caught by the window is detected, is successively changed stepwise by the same displacement value, the total number of the reference medians which are successively changed stepwise is made considerably smaller than the total number of the reference medians respectively set to the divided moving regions of this type of the known power window device. As a result, the storing area $10_1$ of the memory 10 for storing these reference medians can be greatly reduced as compared with the storing area of the memory of this type of the known power window device. At the same time, the storing area of the memory 10 can be effectively used.

Further, according to the foreign matter detecting method of the power window device of the embodiment, the motor load torque Tc is calculated using the result of calculation of the term, which is contained in the formula (1) representing the motor load torque To and stored in the first time table $10_7$ of the memory 10 and corresponds to the value of each motor drive voltage E, on which the motor drive voltage E depends and the result of calculation of the term, which is contained in the same formula (1) and stored in the second time table $10_8$ and corresponds to the value of each edge interval data Pw, on which the edge interval data Pw depends. Accordingly, since the motor load torque Tc can be calculated at a very high speed at the time the edge interval data Pw and the motor drive voltage E are obtained, no time lag arises in the calculation of the motor load torque Tc.

As described above, according to the present invention, the reference median preset to the range, which is set within the entire moving region of the window and where a foreign matter caught by the window is detected, is successively changed stepwise by the same displacement value. Therefore, the total number of the reference medians which are successively changed stepwise is made considerably smaller than the total number of the reference medians respectively set to the divided moving regions of this type of the known power window device. As a result, there can be obtained an advantage that the storing area of the memory for storing these reference medians can be greatly reduced as compared with the storing area of the memory of this type of the known power window device as well as the storing area of the memory can be effectively used.

What is claimed is:

1. A method of detecting a foreign matter caught by a window in a power window device, the power window device including a motor for opening and closing the window through a window drive mechanism when the motor is driven, a motor drive unit for driving the motor, a pulse generator for generating pulses corresponding to the rotation of the motor, a micro controller unit for executing overall control and drive processing and operation switches operated manually for indicating to open and close the window, the method comprising the steps of:

detecting a parameter value indicating a load imposed on the motor driving the window when the window is in operation in a preset range of an entire region of motion of the window;

comparing the detected parameter value with a reference median, the reference median being preset and having an associated window position;

deciding whether a foreign matter is caught by the window, the decision being affirmative when the difference between the parameter value and the reference median is greater than a preset amount; and completing at least one of the group of stopping the drive of the motor and reversing the motor when the decision is affirmative;

determining a position of the window in the preset region from the pulses generated by the pulse generator; and setting the reference median in steps of a specific displacement value successively along the preset region when the decision is negative;

wherein, in the preset region, when the reference median is changed from the reference median that was preset to a new reference median, the window position associated with the reference median that was preset is also changed to a window position associated with the new reference median.

2. The method of detecting a foreign matter caught by a window in a power window device according to claim 1, wherein a new reference median is set by renewing the reference median based on the detected parameter value.

3. The method of detecting a foreign matter caught by a window in a power window device according to claim 1, wherein the parameter value is motor load torque calculated from the width of the pulses generated by the pulse generator.

* * * * *